United States Patent
Kling (12)

(10) Patent No.: US 9,089,226 B2
(45) Date of Patent: Jul. 28, 2015

(54) SUPPORT DEVICE

(75) Inventor: Robert Kling, Skene (SE)

(73) Assignee: SCA HYGIENE PRODUCTS AB, Gothenburg (SE)

( * ) Notice: Subject to any disclaimer, the term of this patent is extended or adjusted under 35 U.S.C. 154(b) by 302 days.

(21) Appl. No.: 13/990,460

(22) PCT Filed: Dec. 10, 2010

(86) PCT No.: PCT/SE2010/051360
§ 371 (c)(1),
(2), (4) Date: May 30, 2013

(87) PCT Pub. No.: WO2007/001901
PCT Pub. Date: Jan. 4, 2007

(65) Prior Publication Data
US 2013/0264925 A1    Oct. 10, 2013

(51) Int. Cl.
*A47K 10/32*    (2006.01)
*A47F 5/08*    (2006.01)
*A47G 1/17*    (2006.01)
(Continued)

(52) U.S. Cl.
CPC . *A47F 5/08* (2013.01); *A47G 1/175* (2013.01); *A47K 5/12* (2013.01); *A47K 10/32* (2013.01); *A47K 2010/3233* (2013.01); *F16B 11/006* (2013.01)

(58) Field of Classification Search
CPC ............ A47G 1/17; A47F 5/08; A47K 10/24; A47K 10/32; A47K 10/424; A47K 5/12
USPC .......................................................... 221/45
See application file for complete search history.

(56) References Cited

U.S. PATENT DOCUMENTS 5,967,474 A    10/1999    doCanto et al.
6,494,424 B1    12/2002    Dickie et al.
(Continued)

FOREIGN PATENT DOCUMENTS

| WO | WO 2007/001901 A1 | 1/2007 |
|---|---|---|
| WO | 2007146516 A1 | 12/2007 |
| WO | 2011002359 A1 | 1/2011 |

OTHER PUBLICATIONS

International Search Report (PCT/ISA/210) issued on Jul. 22, 2011, by the Swedish Patent Office as the International Searching Authority for International Application No. PCT/SE2010/051360.
(Continued)

*Primary Examiner* — Timothy Waggoner
(74) *Attorney, Agent, or Firm* — Buchanan Ingersoll & Rooney PC (57) ABSTRACT

A support device includes a base member having a first side adapted to face a flat surface and a second side opposite to the first side, and a cover member adapted to cover at least partially the base member. The base member is adapted to be attached to the flat surface by a fastening system. The fastening system includes a first surface adapted for the application of a stretch releasable adhesive strip on the first side of the base member. The base member has a through opening extending through the base member from the second side to the first side. The through opening is arranged adjacent to the first surface and is adapted for pulling the stretch releasable adhesive strip at least partially therethrough. The cover member in a first position covers the through opening and in a second position exposes the through opening.

16 Claims, 5 Drawing Sheets

(51) Int. Cl.
*A47K 5/12* (2006.01)
*F16B 11/00* (2006.01)

(56) References Cited

U.S. PATENT DOCUMENTS

| | | | |
|---|---|---|---|
| 6,572,063 B1 * | 6/2003 | Gitelman et al. | 248/314 |
| 6,832,445 B2 | 12/2004 | Pitzen | |
| 7,178,770 B2 | 2/2007 | Ryu et al. | |
| 7,287,720 B1 | 10/2007 | Allegre et al. | |
| 7,503,472 B2 * | 3/2009 | Marks | 227/120 |
| 7,540,456 B2 | 6/2009 | Thompson | |
| 7,721,913 B2 * | 5/2010 | Nash et al. | 221/60 |
| 8,398,041 B2 * | 3/2013 | Brinkdopke et al. | 248/316.7 |
| 8,875,943 B2 * | 11/2014 | Benedetti | 221/283 |
| 2007/0257165 A1 | 11/2007 | Newbould et al. | |

OTHER PUBLICATIONS

Written Opinion (PCT/ISA/237) issued on Jul. 20, 2011, by the Swedish Patent Office as the International Searching Authority for International Application No. PCT/SE2010/051360.

International Preliminary Report on Patentability (PCT/IPEA/409) issued Mar. 22, 2013 by the European Patent Office as the International Examining Authority for International Application No. PCT/SE2010/051360.

Supplementary European Search Report issued on Apr. 9, 2014 by the European Patent Office.

* cited by examiner

SUPPORT DEVICE

TECHNICAL FIELD

The present invention relates to a support device.

BACKGROUND

Stretch releasable adhesive strips are well known in the prior art, for instance are such stretch releasable adhesive strips of the company 3M sold under the product name "Command Strip". A stretch releasable adhesive strip has a first portion with adhesive on both sides of the strip and a second portion without adhesive forming a pull tab. Products may be mounted to a flat surface, such as a wall, by means of the first portion of a stretch releasable adhesive strip. When the product is to be removed from the flat surface a user grasps the pull tab and pulls at it such that the stretch releasable adhesive strip is stretched and the adhesive of the first portion looses its adhesive properties.

The pull tab of a stretch releasable adhesive strip must be reachable for a user in order to allow a product to be removed from the surface to which it is attached. The pull tab may thus be arranged to extend outside a periphery of the product. This arrangement of the pull tab however, has two distinct drawbacks, the aesthetic aspect and the risk of unauthorized tampering with the pull tab. Thus, there have been numerous suggestions of how to conceal and protect the pull tab of a stretch releasable adhesive strip, for instance: U.S. Pat. No. 7,540,456 discloses a base plate attached to a surface by means of a stretch releasable adhesive strip. The base plate and the pull tab of the stretch releasable adhesive strip are covered by a cover plate. U.S. Pat. No. 7,178,770 discloses a support body which is attached to a surface by means of a stretch releasable adhesive strip. A pivotable or removable cover member is attached to the support body. The cover member is dedicated for covering the pull tab of the stretch releasable adhesive strip. WO2007/001901 discloses a base plate which is attached to a surface by means of a stretch releasable adhesive strip. The cover plate is slidably attached to the base plate and covers the base plate and the pull tab of the stretch releasable adhesive strip. U.S. Pat. No. 6,494,424 discloses a container which is attached to a planar supporting structure by means of a stretch releasable adhesive strip. The container comprises at one side thereof retaining means for holding the pull tab of the stretch releasable adhesive strip. The pull tab is folded away from the planar surface and secured in the folded position by means of the retaining means. The pull tab is thus retained generally out of sight. In order to remove the container from the planar structure, the pull tab has to be released from the retaining means. U.S. Pat. No. 5,967,474 discloses a holding device having a base plate which is attached to a surface be means of a stretch releasable adhesive strip. A front functional part of the holding device is folded over the base plate and the pull tab of the stretch releasable adhesive strip.

There still exists a need of concealing and/or protecting a pull tab portion of a stretch releasable adhesive strip.

SUMMARY

An object of the present disclosure is therefore to provide an alternative device which allows concealing and/or protecting a pull tab of a stretch releasable adhesive strip.

According to an aspect of the present disclosure, the object is achieved by a support device for mounting on a flat surface. The support device comprises a base member having a first side adapted to face the flat surface and a second side opposite to the first side, and a cover member adapted to cover at least partially the base member. The base member is adapted to be attached to the flat surface by means of a fastening system. The fastening system comprises a first surface adapted for the application of a stretch releasable adhesive strip on the first side of the base member. The support device is adapted to be arrange with the first surface parallel to the flat surface. The base member has a through opening extending through the base member from the second side to the first side. The through opening is arranged adjacent to the first surface and is adapted for pulling the stretch releasable adhesive strip at least partially therethrough. The cover member in a first position covers the through opening and in a second position exposes the through opening.

Since the base member is provided with the through opening and the stretch releasable adhesive strip is pulled therethorugh when the stretch releasable adhesive strip is removed, there is no need for the stretch releasable adhesive strip to be arranged with its pull tab at an outer periphery of the base member. As a result, the above mentioned object is achieved.

The flat surface may be any flat surface to which a device or an item may be mounted, such as a wall surface, a surface of a cabinet or similar. The support device may be used for mounting or supporting various devices or items from the flat surface. The support device may form part of a device or an item supported from the flat surface. The support device may form the device or item supported. The through opening is understood to be formed within the boundaries of the base member, i.e. it forms a through hole through the base member and is surrounded by material on all sides thereof. As such the first surface may form part of a larger surface. Such larger surface may continue on more than one side of the through opening, or the through opening may be arranged within the larger surface. The base member and the cover member may form one part e.g. by being connected by a hinge, or they or may be two separate parts.

According to embodiments the through opening may be adapted for a pull tab of the stretch releasable adhesive strip to extend therethrough.

According to embodiments an outer surface portion of the first side may be parallel with the first surface, and the outer surface portion may be adapted to abut the flat surface. In this manner the outer surface and the base member may form a hygienic and aesthetic abutment to the flat surface. The outer surface may form a support area, or support point, of the base member by abutting against the flat surface, e.g. at a lower end of the base member as it is subjected to the weight of the support device. The outer surface may extend around the periphery of the base member, or only partially around the base member.

According to embodiments the outer surface portion may project farther out from the first side than the first surface. In this manner the outer surface may abut the flat surface when a stretch releasable adhesive strip is attached to the first surface and the flat surface.

According to embodiments the base member may be resilient between the outer surface portion and the first surface. In this manner the resilience may be utilized to achieve secure attachment of the stretch releasable adhesive strip when the base member is attached to the flat surface. A user may thus press against the base member from its second side to achieve the secure attachment.

According to embodiments, a covering may project at least partially through the through opening. In this manner the through opening and/or the stretch releasable adhesive strip may be covered by the covering. The through opening and/or the stretch releasable adhesive strip may thus be at least partially concealed also when the cover member is not arranged in its first position.

According to embodiments the covering may be adapted to be attached to a pull tab of the stretch releasable adhesive strip. In this manner the pull tab may be manipulated by a user grasping the covering.

According to embodiments the fastening system may comprise a second surface on the first side of the base member, the second surface being parallel to, and on a same level as, the first surface. The second surface is arranged adjacent to the through opening. In this manner the base member may be attached to the flat surface by means of two stretch releasable adhesive strips, the pull tabs of which may be able to be manipulated through the through hole.

According to embodiments the fastening system may comprise a stretch releasable adhesive strip comprising a pull tab. The pull tab may be able to be manipulated via the through opening.

According to embodiments the pull tab may be arranged at a first end of the stretch releasable adhesive strip and the stretch releasable adhesive strip may have a first adhesive side area adapted for attachment to the first surface of the base member and a second adhesive side area adapted for attachment to the flat surface. There may be arranged a non-sticky surface adjacent to the first adhesive side area or the second adhesive side area, at a second end of the stretch releasable adhesive strip opposite to the first end. In this manner different release positions where the stretch releasable adhesive strip releases the base member and the flat surface may be achieved.

According to embodiments the stretch releasable adhesive strip may be provided with a first portion having a smaller width than a width of a second portion of the stretch releasable adhesive strip. The first portion may be arranged closer to the second end of the stretch releasable adhesive strip than to the first end of the stretch releasable adhesive strip. In this manner the pulling force required to release the stretch releasable adhesive strip from the base member and the flat surface may be arranged to be different along a length of the stretch releasable adhesive strip. The pulling force may be smaller along the first portion than along the second portion.

According to embodiments the base member may have a further through opening extending though the base member from the second side to the first side, the further through opening being arranged adjacent to the first surface and the further through opening being adapted for pulling the stretch releasable adhesive strip at least partially therethrough. In this manner the pull tabs of one or two stretch releasable adhesive strips may be grasped at both sides of the first surface.

According to embodiments the fastening system may comprises a further first surface adapted for the application of a stretch releasable adhesive strip on the first side of the base member. The further first surface may be arranged adjacent to a further through opening extending though the base member from the second side to the first side and may be adapted for pulling the stretch releasable adhesive strip at least partially therethrough. In this manner the base member may be attached to the flat surface by means of two stretch releasable adhesive strips.

According to embodiments the cover member may comprise a lock. The lock in a closed state may be arranged to maintain the cover member in the first position. In this manner the cover member may be locked and only a user which is authorized to unlock the lock may have access to the base member and the through opening therein for releasing the stretch releasable adhesive strip therethrough. The lock may be manipulated by a mechanical key, or electronically by means of a code or a security card, or by other means.

According to embodiments the cover member may form at least part of a dispenser. The cover member may form a dispenser or part of a dispenser. The dispenser may be refillable or may be a disposable dispenser.

According to embodiments the dispenser may be a dispenser for a roll or a stack of sheet products and/or a dispenser for a cleansing agent. The sheet products may be paper, tissue, or nonwoven products. The paper, tissue or nonwoven products may be absorbent. The sheet products may be used, inter alia as: towels, napkins, wipers, bathroom paper/tissue, kitchen paper/tissue, etc. Cleansing agents may be soap, disinfectants, etc. A cleansing agent may be provided in the form of liquid, powder, or foam.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout.

Well-known functions or constructions will not necessarily be described in detail for brevity and/or clarity.

Figure 1:
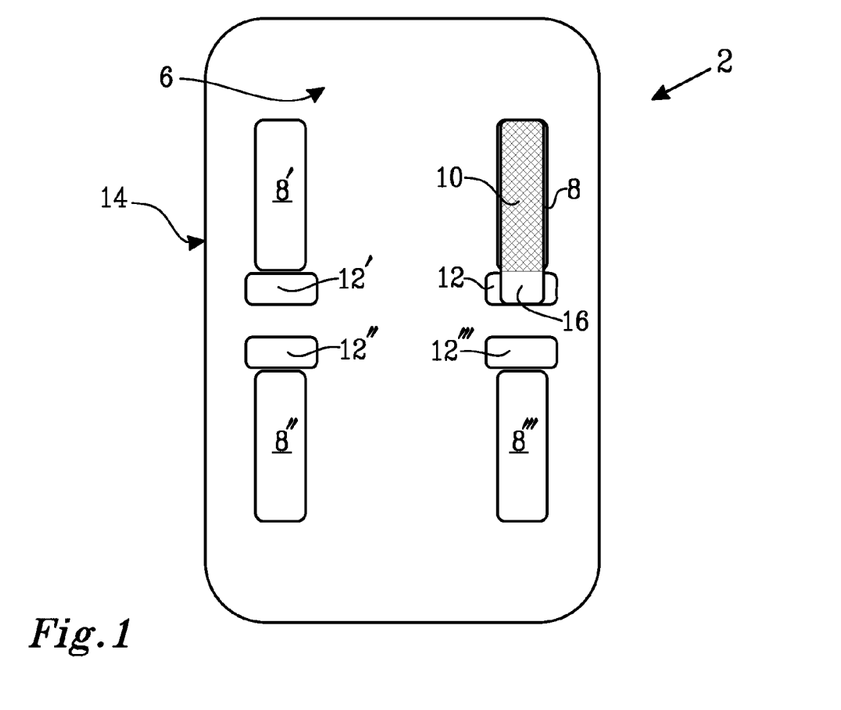
FIGS. 1, 2 and 4 illustrate embodiments of base members of support devices to be mounted on flat surfaces.

FIG. 1 illustrates embodiments of a base member 2 of a support device to be mounted on a flat surface, such as a wall surface. The base member 2 is illustrated from a first side 6 which is adapted to face the flat surface. The base member 2 is adapted to be fastened to the flat surface by means of a fastening system. The fastening system comprises a first surface 8 on the first side 6 of the base member 2. The first surface 8 is substantially flat. When the base member 2 is attached to the flat surface the first surface 8 is parallel to the flat surface. The first surface 8 is adapted for the application of a stretch releasable adhesive strip 10. The first surface 8 may protrude from the first side 6, or it may be distinguished from the first side 6 by markings such as indentations or visual lines. The base member 2 is provided with a through opening 12 which extends through the base member 2 between the first side 6 and a second side on the opposite side of the base member 2.

The through opening 12 is arranged within the outer periphery of the base member 2. The through opening 12 is arranged adjacent to the first surface 8 such that a pull tab portion 16 of the stretch releasable adhesive strip 10 may be grasped and pulled through the through opening 12 from the second side of the base member 2.

Depending on the weight a base member has to carry, there may be provided one or more surfaces for stretch releasable adhesive strips for attachment of the base member 2 to the flat surface. A through opening is arranged adjacent to each such surface. The illustrated base member 2 is provided with three further first surfaces 8', 8", 8'" and three further through openings 12', 12", 12'". The illustrated base member 2 may thus form part of a support device forming part of dispenser arrangement, such as a dispenser for rolls, or stacks, of absorbent tissue paper.

Figure 2:
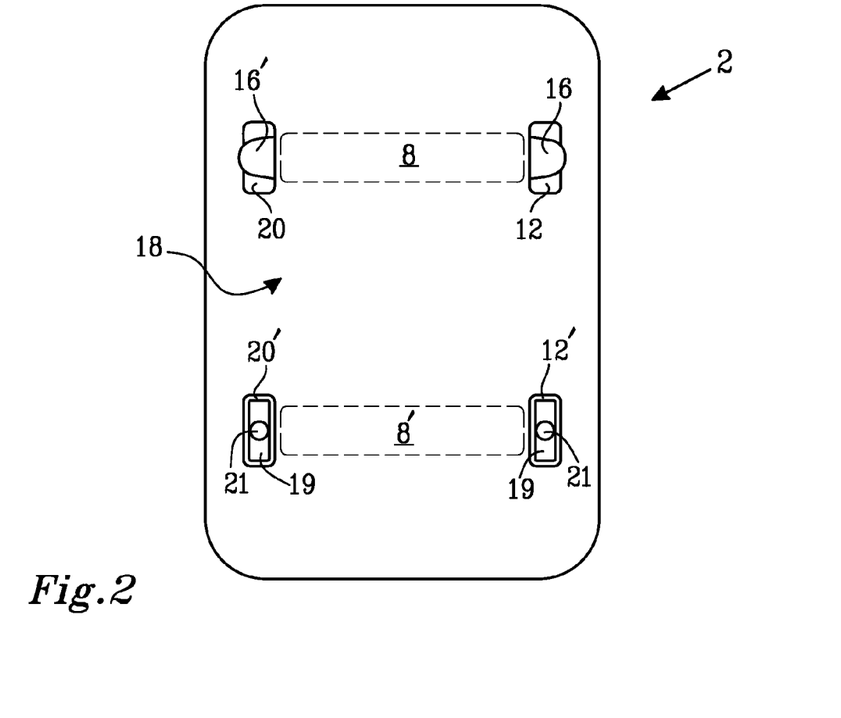

FIG. 2 illustrates embodiments of a base member 2 of a support device to be mounted on a flat surface, such as a wall surface. The base member 2 is illustrated from a second side 18, which in use is covered at least partially by a cover member. On a first side of the base member 2 opposite to the second side 18, the base member 2 is provided with a first surface 8 (illustrated with dashed lines) forming part of a fastening system. The first surface 8 is adapted to be used for attaching the base member 2 to a flat surface by means of a stretch releasable adhesive strip. A through opening 12 and a further through opening 20 are arranged adjacent to the first surface 8, at two ends of the first surface 8. A stretch releasable adhesive strip having two pull tabs 16, 16', one at each end of the stretch releasable adhesive strip may thus be used in these embodiments. One pull tab 16, 16' is arranged at each of the through opening 12 and the further through opening 20. When removing the base member 2 from the flat surface, a user may thus pull at each of the pull tabs through the through opening 12 and the further through opening 20 simultaneously. The stretch releasable adhesive strip is pulled, and extends, through the through openings 12, 20 as it looses its adhesive grip from the flat surface and the base member 2. When the stretch releasable adhesive strip has lost its adhesive grip, the user will be able to hold, at least for a moment, the base member 2 by means of the stretch releasable adhesive strip extending through the through openings 12, 20. It may thus be prevented that the base member 2 falls to the ground as it is removed from the flat surface.

In connection with a further first surface 8' (illustrated with dashed lines) on the first side of the base member 2 and two more through openings 12', 20', there are illustrated coverings 19 arranged in the through openings 12', 20'. Each covering 19 projects at least partially through a respective through opening 12', 20'. Thus, a covering 19 covers at least partially a through opening 12', 20'. The covering is 19 connected to a pull tab portion of a stretch releasable adhesive strip. The covering is provided with a gripping member 21. When the base member 2 is to be removed from a flat surface, a user may thus grasp the gripping member 21 to pull at the pull tab of the stretch releasable adhesive strip.

As an alternative to using a two pull tab stretch releasable adhesive strip, two separate stretch releasable adhesive strips may be attached to the first surface 8 in the FIG. 2 embodiments. The two stretch releasable adhesive strips having one pull tab each. A further alternative may be to use a two pull tab stretch releasable adhesive strip on one of the illustrated first surfaces 8, 8' and two one pull tab stretch releasable adhesive strips on another of the first surfaces 8, 8'.

Figure 3:
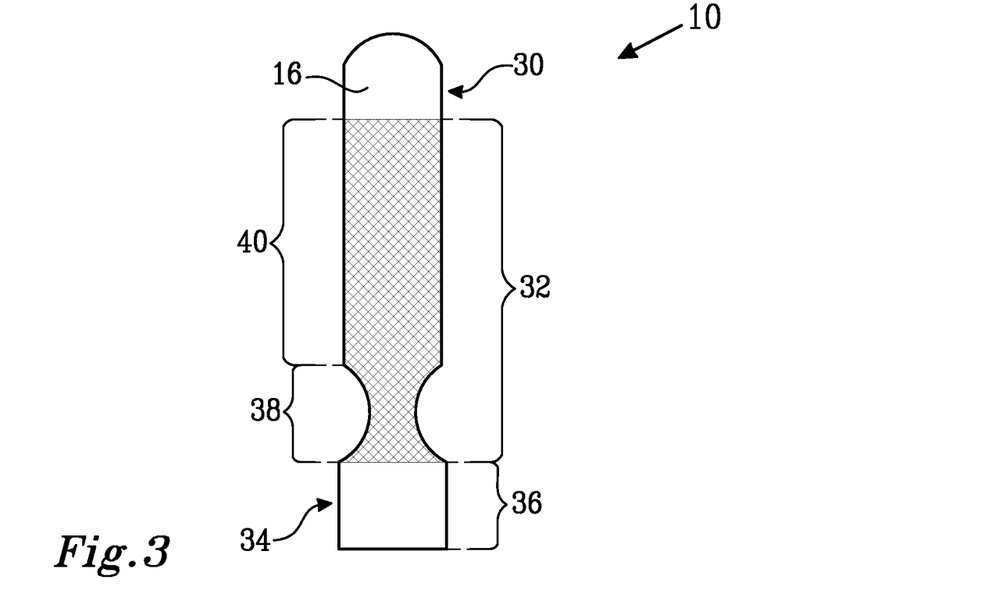
FIG. 3 illustrates a stretch releasable adhesive strip according to embodiments.

FIG. 3 illustrates a stretch releasable adhesive strip 10 according to embodiments.

A pull tab 16 is arranged at a first end 30 of the stretch releasable adhesive strip 10. The pull tab end of the strip 10 is not provided with any adhesive. The stretch releasable adhesive strip 10 has a first adhesive side area 32 adapted for attachment to a surface. Adjacent to the first adhesive side area 32 at a second end 34 of the stretch releasable adhesive strip 10 there is a non-sticky surface area 36. On the non-shown side of the stretch releasable adhesive strip 10, the strip 10 has a second adhesive side area also adapted for attachment to a surface. The second adhesive side area has a longitudinal extension corresponding to the length of the first adhesive side area 32 and the non-sticky surface area 36, together.

When the stretch releasable adhesive strip 10 is brought to release its adhesive grip by a user pulling at the pull tab 16, the stretch releasable adhesive strip 10 will first loose its adhesive grip on its side having the first adhesive side area 32, due to the adjacent non-sticky surface area 36. In case the first adhesive side area 32 is attached to a base member and the second adhesive side area is attached to a flat surface, the base member will be released from the strip 10 before the strip 10 looses its adhesive grip with the flat surface. Thus the base member, at least for a moment, will be suspended from the stretch releasable adhesive strip 10 extending between the hand of a user holding the pull tab 16 and the second end 34 of the strip 10 still being attached to the flat surface. If on the other hand the first adhesive side area 32 is attached to the flat surface and the second adhesive side area is attached to the base member, the strip 10 loses its adhesive grip from the flat surface first. Thus the base member, at least for a moment, will be suspended freely from the stretch releasable adhesive strip 10 as the second adhesive side area is still adhesively attached to the base member. In both cases the user removing the base member will be able to catch the base member before it falls to the ground.

The stretch releasable adhesive strip 10 is provided with a first portion 38 having a smaller width than a width of a second portion 40 of the strip 10. The first portion 38 is arranged closer to the second end 34 than to the first end 30 of the strip 10. The first portion may be arranged adjacent to the non-sticky surface area 36. At the first portion 38 having a smaller width, a smaller pulling force is required to release the strip 10 than at the second portion 40 of the strip 10. A user pulling at the pull tab 16 when releasing the base member from the flat surface will thus get the sensation of this reduced pulling force when the first portion 38 is reached. A user is thus alerted by this sensation that the base member is about to loose its grip from the stretch releasable adhesive strip 10, i.e. the sensation is sensed as the last portion of the adhesive of the first adhesive side area 32 is about to loose its adhesive grip.

Alternatives to the embodiments illustrated in FIG. 3 may be a stretch releasable adhesive strip without the non-sticky surface 36, i.e. with adhesive at the second end 34, or a stretch releasable adhesive strip with even width, i.e. without the first portion 38. Accordingly, each feature—non-sticky surface 36 and first portion 38 having a smaller width—may be utilised on its own in a stretch releasable adhesive strip.

Figure 4:
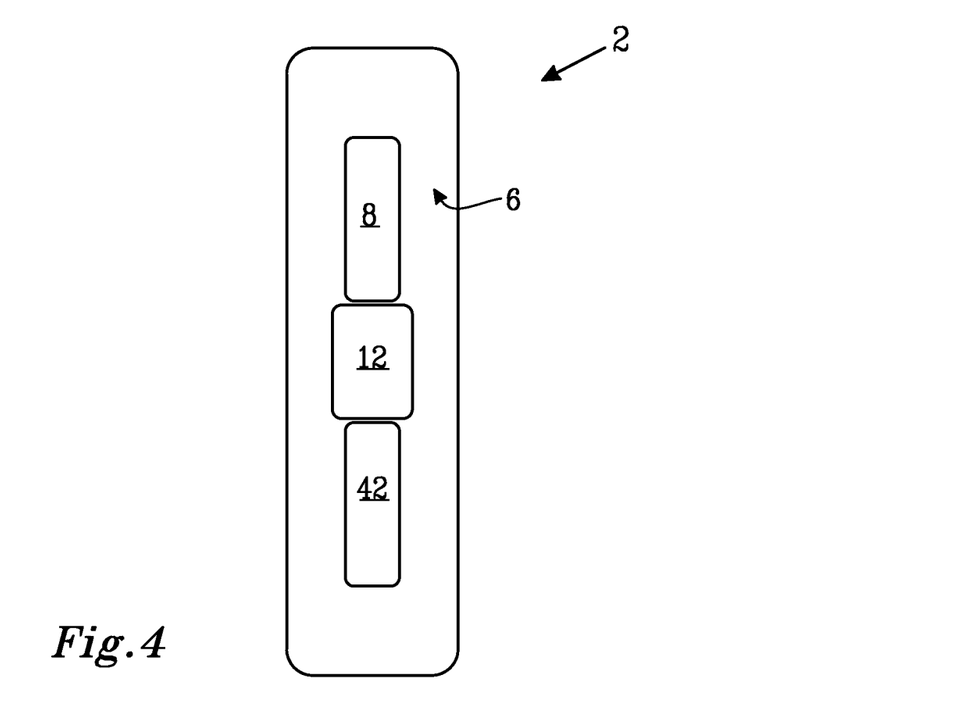

FIG. 4 illustrates embodiments of a base member 2 of a support device to be mounted on a flat surface, such a wall surface. The base member 2 is illustrated from a first side 6 which is adapted to face the flat surface. The base member 2 is adapted to be fastened to the flat surface by means of a fastening system. The fastening system comprises a first surface 8 and a second surface 42 on the first side 6 of the base member 2. When the base member 2 is attached to the flat surface, the first surface 8 and the second surface are parallel to the flat surface. The first and second surfaces 8, 42 are furthermore on a same level. The base member 2 is provided with a through opening 12 which extends through the base member 2 between the first side 6 and a second side on the opposite side of the base member 2. The through opening 12 is arranged adjacent to the first surface 8 and adjacent to the second surface 8'. A first stretch releasable adhesive strip may be attached to the first surface 8 and a second stretch releasable adhesive strip may to be attached to the second surface 42. A pull tab portion of each of the first and second stretch releasable adhesive strips may be grasped and pulled through the through opening 12 from the second side of the base member 2.

Figure 5:
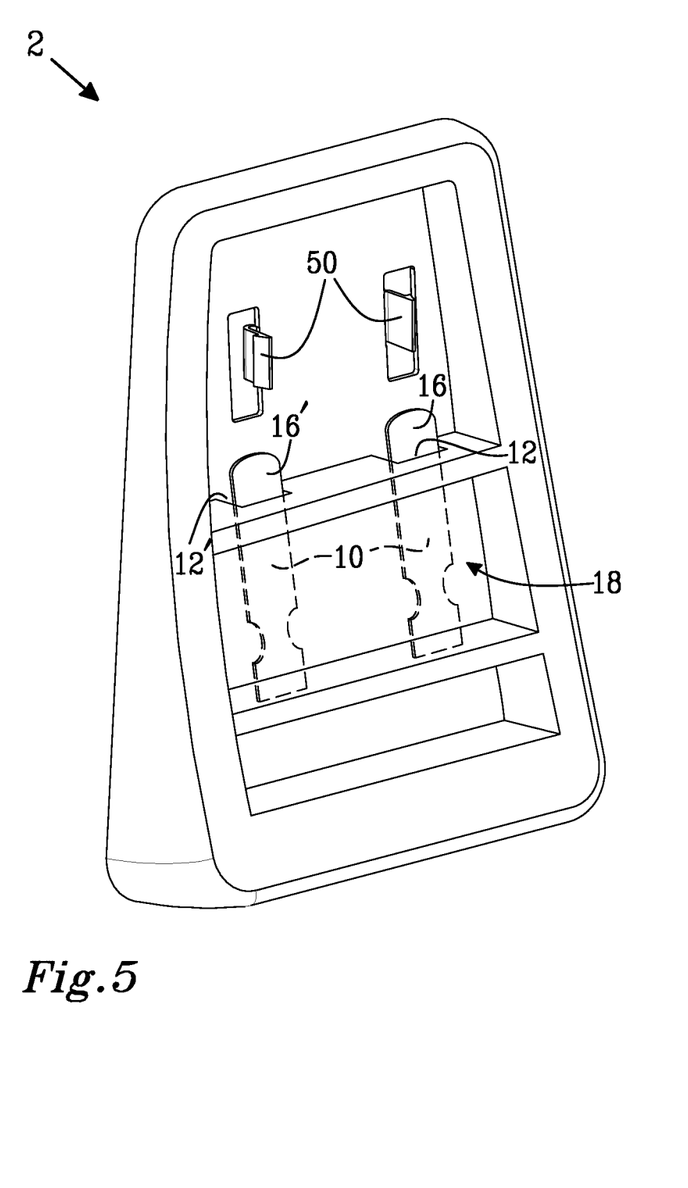
FIG. 5 illustrates a base member of a support device according to embodiments.

FIG. 5 illustrates a base member 2 of support device according to embodiments. The base member 2 is adapted to be attached to a flat surface such as a wall by means of two stretch releasable adhesive strips 10. The base member 2 has a first side facing the flat surface and a second side 18 opposite to the first side and facing away from the flat surface. The base member 2 is provided with two first surfaces on the first side. Each stretch releasable adhesive strip 10 is attached to a first surface. The base member 2 is provided with two through openings 12, 12' through which pull tabs of each stretch releasable adhesive strip 10 extend at least partially. Thus, when a user is to remove the base member 2 from the flat surface, the adhesive strips 10 may be pulled through the through openings 12, 12'.

The base member 2 is provided with releasable snap fit connectors 50 for attaching a cover member of the support device to the base member 2. The cover member covers the though openings 12, 12', and thus at least partially the base member, such that the pull tabs 16, 16' are not visible and cannot be reached without removing the cover member. Accordingly, the cover member in a first position covers the through opening and in a second position exposes the through opening. The cover member may be adapted for covering only but may alternatively have at least one further function such as forming a hanger, forming an attachment device for arrangements to be attached to a flat surface e.g. a shelving system, or a dispenser for paper, tissue, or soap.

Figure 6:
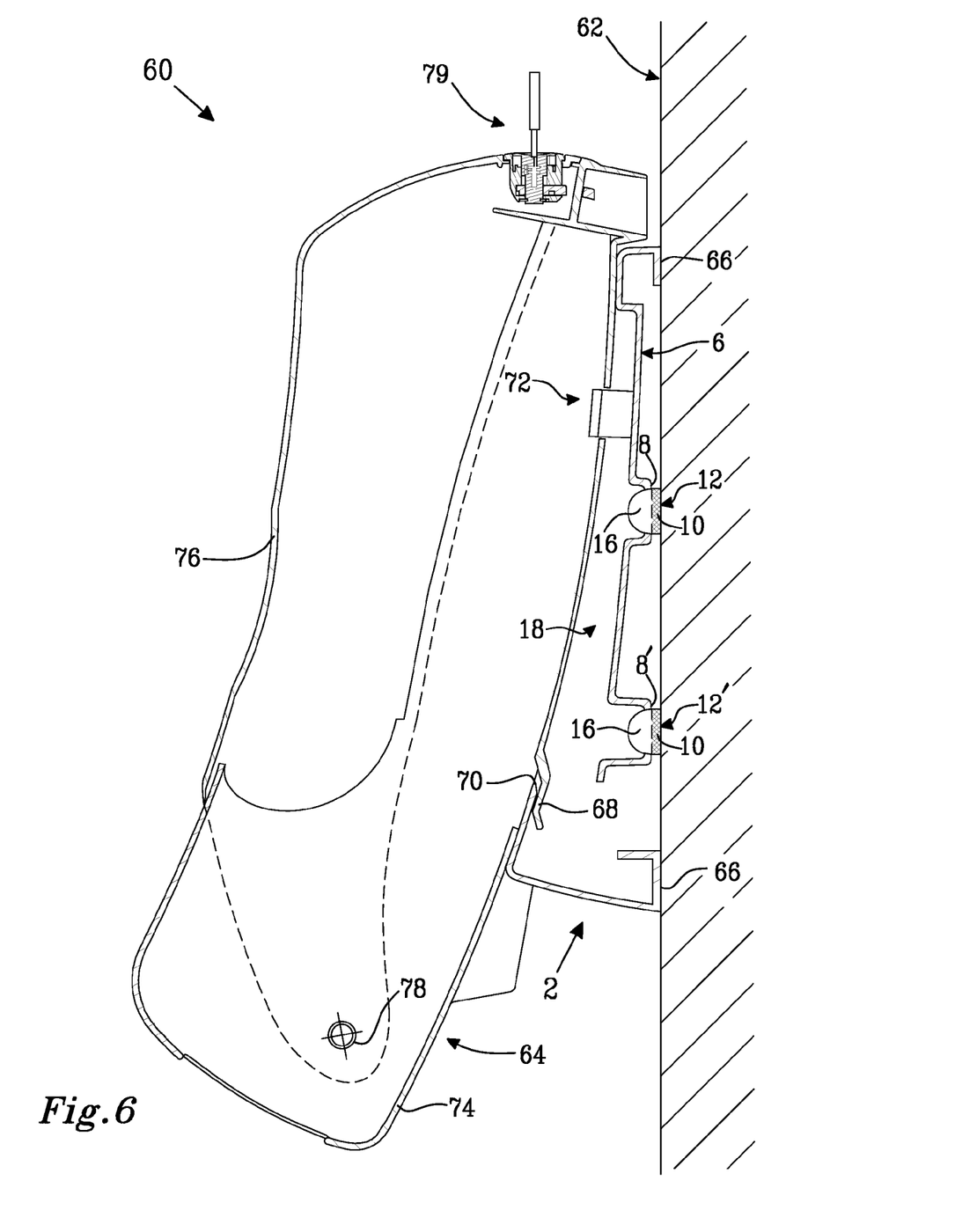
FIGS. 6-8 illustrate support devices according to embodiments.

FIG. 6 illustrates a support device 60 according to embodiments. The support device 60 comprises a base member 2 to be attached to a flat surface, such as a wall surface 62. The support device 60 comprises a cover member 64, forming a dispenser. In these embodiments the cover member 64 is a dispenser for sheet products in the form of a stack of e.g. sheets of paper or tissue. The base member 2 has a first side 6 and a second side 18. The first side 6 faces the wall surface 62. The second side 18 is opposite to the first side 6 and faces the cover member 64. The first side 6 is provided with a first surface 8 and a further first surface 8'. The first surfaces 8, 8' are parallel to the wall surface 62. In the base member 2, adjacent to each of the first surfaces 8, 8', there are arranged a through opening 12 and a further through opening 12', respectively. The base member 2 is attached to the wall surface 62 by means of two stretch releasable adhesive strips 10. Pull tabs 16 of the stretch releasable adhesive strips 10 extend at least partially through the through openings 12'.

The base member 2 is on the first side 6 provided with an outer surface portion 66 which runs along an outer periphery of the base member 2. The outer surface portion 66 is parallel with the first surfaces 8, 8'. The outer surface portion 66 abuts the wall surface 62 when the base member is attached to the wall surface 62. Accordingly, the outer surface portion 66 projects farther out from the first side 6 than the first and further first surfaces 8, 8' in order for the stretch releasable adhesive strips 10 to fit between the first surfaces 8, 8' and the wall surface 62. The base member 2 may be resilient between the outer surface portion 66 and the first surfaces 8, 8' to allow a user to apply pressure to the first surfaces 8, 8' from the second side 18 when attaching the base member 2 to the wall surface 62 using the stretch releasable adhesive strips 10.

The cover member 64 is attached to the base member 2 by means of a projection 68 cooperating with an edge portion 70 of the base member 2 and a snap fit releasable connection 72. When the cover member 64 is connected to the base member 2 it is in a first position and covers the through openings 12, 12'. When the snap fit connection 72 is released the cover member 64 may be removed from the base member 2 and thus be in a second position wherein the through openings 12, 12' are exposed.

The cover member 64 has a body part 74 and a lid 76 which is connected to the body part via a hinge 78. The cover member 64 comprises a lock 79 by means of which the lid 76 may be locked against the body part 74. When the lock 79 is locked the cover member 64, may not be removed from the base member 2 to expose the through openings 12, 12', i.e. when the lock 79 is in a closed state the cover member 2 is maintained in the first position because access to the snap fit connection 72 is prevented.

Figure 7:
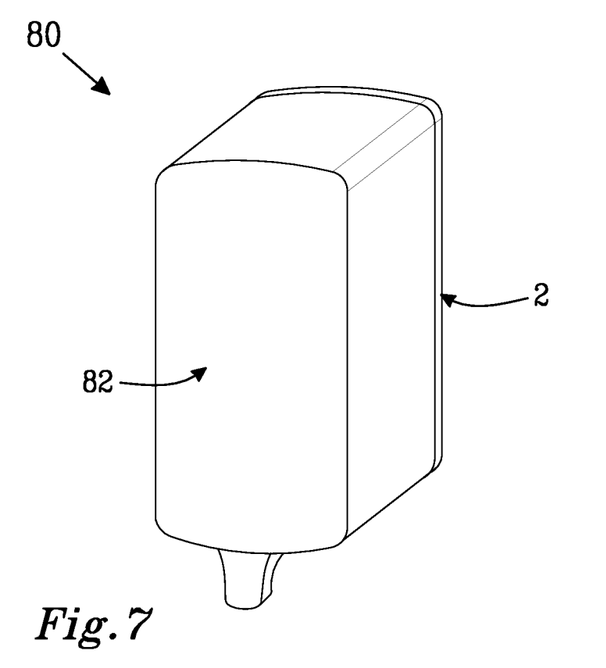

FIG. 7 illustrates schematically a support device 80 according to embodiments. The support device 80 comprises a base member 2 to be attached to a flat surface, such as a wall surface. The support device 80 comprises a cover member 82, forming a dispenser. In these embodiments the cover member 82 is a dispenser for a cleansing agent such as liquid soap.

Figure 8:
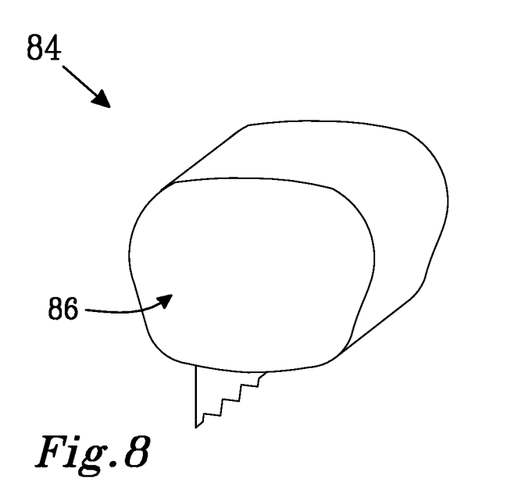

FIG. 8 illustrates schematically a support device 84 according to embodiments. The support device 84 comprises a base member (not visible) to be attached to a flat surface, such as a wall surface. The support device 84 comprises a cover member 86, forming a dispenser. In these embodiments the cover member 86 is a dispenser for sheet products in the form of a roll of paper tissue which may be dispensed at a lower end of the dispenser.

Example embodiments described above may be combined as understood by a person skilled in the art. It is also understood by those skilled in the art that the through opening for pulling a stretch releasable adhesive strip therethrough may be formed in any kind of flat, angled, or curved surface. A pull tab of a stretch releasable adhesive strip may be substantially flush with the flat surface and be pulled though the through opening at the time of releasing a base member from the flat surface. Alternatively, the pull tab may extend, at least partially, through the through opening already when the base member is mounted to the flat surface. The lock may be arranged to engage between the cover member and the base member.

A support device and/or a base member may be provided with the stretch releasable adhesive strip already attached to the first surface. On the side of the stretch releasable adhesive strip to be attached to a flat surface, there may be provided with a protective foil. Thus, for the support device/base member a suitable position on a flat surface may be tried out. When the support device/base member is to be attached to a flat surface the protective foil is removed from the stretch releasable adhesive strip and the support device/base member is pressed against the flat surface. Separate stretch releasable adhesive strips as such may be provided with protective foil on both adhesive sides. When a support device and/or a base member is removed from a flat surface the old stretch releasable adhesive strip is discarded. The support device and/or the base member may be reattached using a new stretch releasable adhesive strip.

Further examples of a support devices may be hook, hanger, knob, shelf, and waste bin.

Therefore, it is to be understood that the foregoing is illustrative of various example embodiments and the invention is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "on", "coupled" or "connected" to another element, it can be directly on, coupled or connected to the other element or intervening elements may also be present. In contrast, when an element is referred to as being "directly on", "directly coupled" or "directly connected" to another element, there are no intervening elements present.

It will be understood that although the terms first, second, third etc. may be used herein to describe various elements, components, regions, layers and/or sections, these elements, components, regions, layers and/or sections should not be limited by these terms. These terms are only used top distinguish one element, component, region, layer or section from another element, component, region, layer or section. Thus, a first element, component, region, layer or section discussed herein could be termed a second element, component, region, layer or section without departing from the teachings of the present disclosure.

Spatially relative terms, such as "beneath", "below", "bottom", "lower", "above", "top", "upper" and the like, may be used herein for ease of description to describe one element's or feature's relationship to other element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Also, as used herein, "lateral" refers to a direction that is substantially orthogonal to a vertical direction.

Example embodiments of the present invention have been described herein with reference to cross-section illustrations that are schematic illustrations of idealized embodiments (and intermediate structures) of the invention. As such, variations from the shapes of the illustrations as a result, for example, of manufacturing techniques and/or tolerances are to be expected. Thus, embodiments of the present invention should not be construed as limited to the particular shapes of regions illustrated herein but are to include deviations in shape that result, for example, from manufacturing.

The invention claimed is:

1. A support device for mounting on a flat surface, the support device comprising a base member having a first side adapted to face the flat surface and a second side opposite to the first side, and a cover member adapted to cover at least partially the base member, wherein the base member is adapted to be attached to the flat surface by a fastening system, and the fastening system comprises a first surface adapted for the application of a stretch releasable adhesive strip on the first side of the base member, and wherein the support device is adapted to be arranged with the first surface parallel to the flat surface,
   the base member having a through opening extending through the base member from the second side to the first side, the through opening being arranged adjacent to the first surface and being adapted for pulling the stretch releasable adhesive strip at least partially through the through opening,
   wherein the cover member in a first position covers the through opening and in a second position exposes the through opening, and
   wherein the cover member forms at least part of a dispenser.

2. The support device according to claim 1, wherein the through opening is adapted for a pull tab of the stretch releasable adhesive strip to extend through the through opening.

3. The support device according to claim 2, wherein an outer surface portion of the first side is parallel with the first surface, and the outer surface portion is adapted to abut the flat surface.

4. The support device according to claim 3, wherein the outer surface portion projects farther out from the first side than the first surface.

5. The support device according to claim 4, wherein the base member is resilient between the outer surface portion and the first surface.

6. The support device according to claim 1, wherein a covering projects at least partially through the through opening.

7. The support device according to claim 6, wherein the covering is adapted to be attached to a pull tab of the stretch releasable adhesive strip.

8. The support device according to claim 1, wherein the fastening system comprises a second surface on the first side of the base member, the second surface being parallel to, and on a same level as, the first surface, and wherein the second surface is arranged adjacent to the through opening.

9. The support device according to claim 1, wherein the fastening system comprises a stretch releasable adhesive strip comprising a pull tab, and wherein the pull tab is manipulatable via the through opening.

10. The support device according to claim 9, wherein the pull tab is arranged at a first end of the stretch releasable adhesive strip and the stretch releasable adhesive strip has a first adhesive side area adapted for attachment to the first surface of the base member and a second adhesive side area adapted for attachment to the flat surface, and wherein a non-sticky surface is arranged adjacent to the first adhesive side area or the second adhesive side area, at a second end of the stretch releasable adhesive strip opposite to the first end (30).

11. The support device according to claim 10, wherein the stretch releasable adhesive strip is provided with a first portion having a smaller width than a width of a second portion of the stretch releasable adhesive strip.

12. The support device according to claim 11, wherein the first portion is closer to the second end of the stretch releasable adhesive strip than to the first end of the stretch releasable adhesive strip.

13. The support device according to claim 1, wherein the base member has a further through opening extending though the base member from the second side to the first side, the further through opening being arranged adjacent to the first surface and the further through opening being adapted for pulling the stretch releasable adhesive strip (10) at least partially through the further through opening.

14. The support device according to claim 1, wherein the fastening system comprises a further first surface adapted for the application of a further stretch releasable adhesive strip on the first side of the base member, and the further first surface is arranged adjacent to a further through opening extending through the base member from the second side to the first side and being adapted for pulling the further stretch releasable adhesive strip at least partially through the further through opening.

15. The support device according to claim 1, wherein the cover member comprises a lock, and the lock in a closed state is arranged to maintain the cover member in the first position.

16. The support device according to claim 1, wherein the dispenser is at least one of a dispenser for a roll or a stack of sheet products and a dispenser for a cleansing agent.

* * * * *